United States Patent [19]

Eastwood et al.

[11] Patent Number: 4,640,576
[45] Date of Patent: Feb. 3, 1987

[54] METHOD AND APPARATUS FOR TUBING OPTICAL FIBERS

[75] Inventors: H. Keith Eastwood, Winnipeg; Paul W. J. Rivett, Scarborough, both of Canada

[73] Assignee: Canada Wire and Cable Limited, Toronto, Canada

[21] Appl. No.: 624,825

[22] Filed: Jun. 26, 1984

[51] Int. Cl.⁴ .............................................. G02B 6/44
[52] U.S. Cl. ................................................ 350/96.23
[58] Field of Search ...................... 350/96.23; 65/5, 7

[56] References Cited

U.S. PATENT DOCUMENTS

| | | | |
|---|---|---|---|
| 4,153,332 | 5/1979 | Longoni | 350/96.23 |
| 4,332,436 | 6/1982 | Adorni et al. | 350/96.23 |
| 4,372,792 | 2/1983 | Dey et al. | 350/96.23 |
| 4,446,686 | 5/1984 | Panuska et al. | 350/96.23 |

Primary Examiner—William L. Sikes
Assistant Examiner—Robert E. Wise
Attorney, Agent, or Firm—Fleit, Jacobson, Cohn & Price

[57] ABSTRACT

A process and apparatus for controlling the feed of an optical fiber or a plurality of optical fibers into a tube while the tube is being formed is disclosed. The process comprises the steps of propelling one or several fibers into a tube with a sufficient force to move the fibers at a speed faster than the speed at which the tube is formed, and of regulating the excess length of fiber by restraining the feed of fiber into the tube at a predetermined ratio with respect to the speed at which the tube is being formed.

10 Claims, 5 Drawing Figures

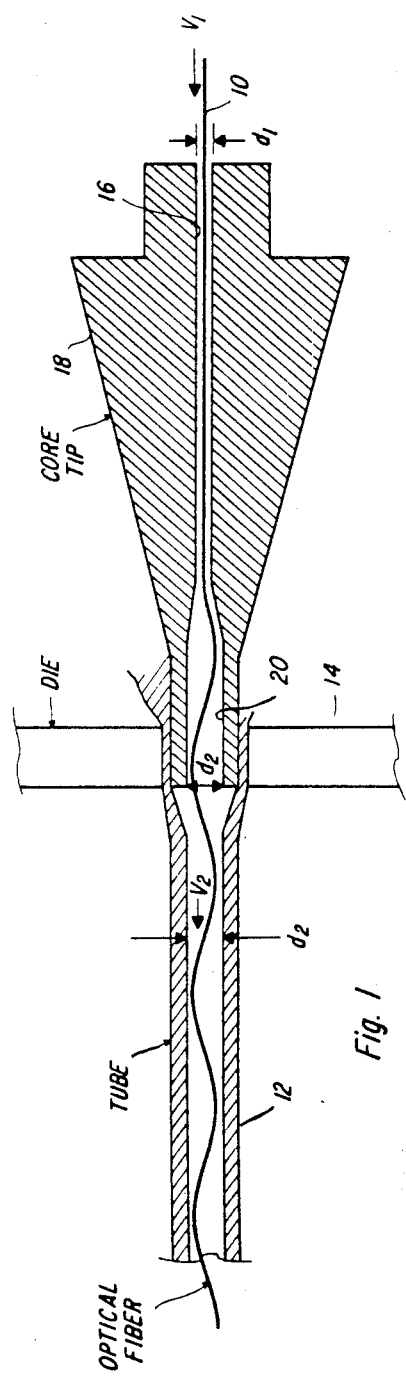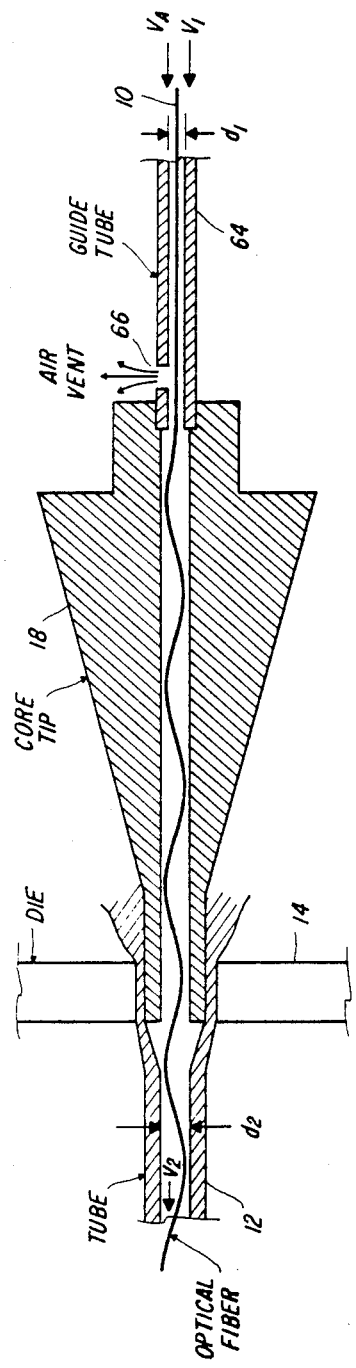

METHOD AND APPARATUS FOR TUBING OPTICAL FIBERS

This invention relates to a method and a system for tubing optical fibers, and more particularly for controlling the feed of fiber into a tube while the tube is being formed.

Optical fibers have a low value of tensile strength and a very low tolerable elongation; it is therefore necessary to limit the strain on the fibers in order to ensure a long cable life without fiber breaking. Light propagation through optical fibers is very sensitive to lateral stresses and deformations in the fiber; to provide optimum transmission characteristics, the fiber should be stress free. The principal objective of a fiber optic cable structure is to prevent undue stresses and strains on the optical fiber element while the cable itself undergoes the rigors of cable installation and environmental effects.

One popular method of protecting the fibers is to isolate them from the cable structure; one or more fibers are loosely inserted into a tube having an inside diameter many times that of the fibers contained therein. The fibers are free to move in the tube, which may be either empty or filled with a grease or jelly-like material through which the fibers can pass. The tubes are stranded helically around a central strength member thereby constituting the core of a fiber optic cable.

The cable is completed by applying binder tapes, cushioning material, interstitial filling material, additional strength members and a number of combinations of tapes and jackets to form the cable sheath.

In the loose tube cable constructions, the fibers are free from stress for a range of effective cable strains. The effective cable strain is the change in the length of the cable caused by the combination of tensile load (by virtue of the cable's tensile modulus) and cable temperature (by virtue of the cable's composite thermal expansion coefficient). The range of acceptable effective cable strains, where the fibers remain unstressed, is determined by the geometry of the cable design, whereas the specific effective strain limit depends also on the specific amount of fiber slack contained in the tube at zero cable strain. Thus the performance of a loose tube cable is related to the cable geometry, the properties of the cable constituents, and the amount of fiber slack in the tube when the cable has zero effective strain.

The terms "excess length" and "fiber slack" refer to the difference in length between the fiber and the axis of the loose tube in accordance with the following relationship.

$$E = (F - T)/T \times 100\%$$

where
E is the excess length expressed as a percentage
F is the fiber length
T is the tube length If the tube was perfectly straight, it is easy to see that the fiber can be the same length as the tube (if it lies in a straight line inside the tube) or can be longer than the tube (if it lies in a curved, or coiled, path inside the tube). However, it is not possible for the fiber to be shorter than the tube. Consequently, the excess length, as its name implies, is normally thought to be greater than or equal to zero ($E \geq 0$).

The more general case is a curved tube; in fact when a tube is stranded into the cable core it follows a curved path. If a tube is curved its length is normally defined by the axis of the tube. The fiber, however, can be shorter than the axis of a curved tube, thus the excess length can be negative. As an illustration, consider a tube with an inside radius r; the tube is curved into a circle with radius R extending from the center of the circle to the axis of the tube. In this case the tube length (axis length) is $2\pi R$. The shortest path length inside the tube is along the inside wall closest to the center of the circles: this path length is $2\pi(R-r)$. If the fiber, which has a negligible thickness in this illustration, follows the shortest path the excess length would be: $E = -r/R \times 100\%$. Thus in the general case of fibers in curved tubes, the excess length can be positive, negative or zero.

The quantity of fiber slack usually varies from one point to another in a length of fiber optic cable, but it does not tend to equalize when the cable is strained. Instead the portion of the cable containing the least fiber slack will initially suffer optical degradation under cable tension in accordance with the local quantity of fiber slack. Similarly the portion of the cable containing the most fiber slack will initially suffer optical degradation under cable compression (or contraction at low temperature) in accordance with the local quantity of fiber slack. Clearly the acceptable temperature and tension performance range is reduced as the range of fiber slack in the tube increases. The performance of a fiber optic cable based on the loose tube construction is optimized when the quantity of fiber slack in the tube is maintained at some predetermined optimum value throughout the entire length of the cable. This optimum value is determined by the cable design and the expected cable load and operating temperature range. The optimum excess length or fiber slack can be positive, negative or zero.

During the fiber tubing operation, the friction of the fiber against the inside wall of a tube being formed by extrusion is enough to guide in the fiber at a rate equal to or slightly less than the rate at which the tube is formed. This process is adequate when a specific negative level of excess length is required. When zero or positive excess length is required a more positive force on the fiber is required. It has been extremely difficult up to now to precisely control the amount of fiber slack in a buffer tube (at any level) because the controlling factor is the inner surface friction of a partially cooled extrudate which is dependent upon process conditions such as tube diameter and speed, melt temperature, water trough temperature, etc. One way to overcome the above problems is by stretching the tube between a brake and a wheel capstan while allowing the fiber to slip inside the tube, as disclosed in the U.S. Pat. No. 4,153,332 issued May 8, 1979. The tension is released after the wheel capstan, allowing the tube to relax, causing an excess length of fiber to accumulate inside the tube. The problem with this method is the fact that there is fiber slippage at the wheel capstan since fiber tension cannot be maintained on the take up side. Consequently, there will not be a uniform fiber length.

It is therefore the object of the present invention to provide a method and a system for more precisely controlling excess length of fibers in a buffer tube.

The method in accordance with the present invention, comprises propelling a fiber or plurality of fibers into a tube with a sufficient force to move the fiber or fibers at a speed faster than the speed at which the tube is formed; and regulating the excess length of fiber by restraining the feed of fiber into the tube at a predetermined ratio with respect to the speed at which the tube is being formed. This ratio may be less than, greater than or equal to one depending on the cable design requirements.

Propelling of the fiber(s) into the tube is preferably done by forcing a fluid compound or air into the tube along side the fiber through an orifice smaller than the inside diameter of the tube. Because the fluid compound or air is supplied through an orifice which is smaller than the diameter of the tube, the fluid or air jet and hence the fiber entrained thereby by friction will move faster than the tube. The ratio of the diameter of the orifice to the diameter of the tube is selected so that there is enough force to cause an excess length of fiber to be pulled into the tube.

Regulation of the excess length of fiber is preferably done by controlling the fiber pay-off speed. Any type of non-slip capstan may be used to pull one or several fibers from respective pay-off spools and feed them into the tube, although a pair of pinch rollers is the simplest. The pinch rollers are preferably driven by a motor the speed of which can be accurately controlled, such as D.C. motor, a stepping motor or an AC motor controlled by phase sensitive signal processing techniques. The buffer tube is pulled by a capstan which is powered by a suitable variable speed motor. In a first aspect of the present invention, the speed of the pinch rollers as well as the speed of the tube capstan are continuously monitored by optical digital tachometers and the digital signals from both tachometers are used by a digital comparator to control the speed of the pinch rollers in order to maintain a constant relative speed thereby obtaining the preset excess length ratio. The error in this approach is on the order of ±0.02%. In a second aspect of the present invention, the tube capstan could be mechanically linked to the pinch rollers. In such a case, the ratio would be permanently set according to the geometry of the linkage.

The invention will now be disclosed, by way of example, which reference to the accompanying drawings in which:

FIG. 1 illustrates the principle of achieving excess fiber length with a fluid system;

FIG. 4 illustrates the principle of achieving excess fiber length using air as the fluid filling the buffer tube.

Figure 2:
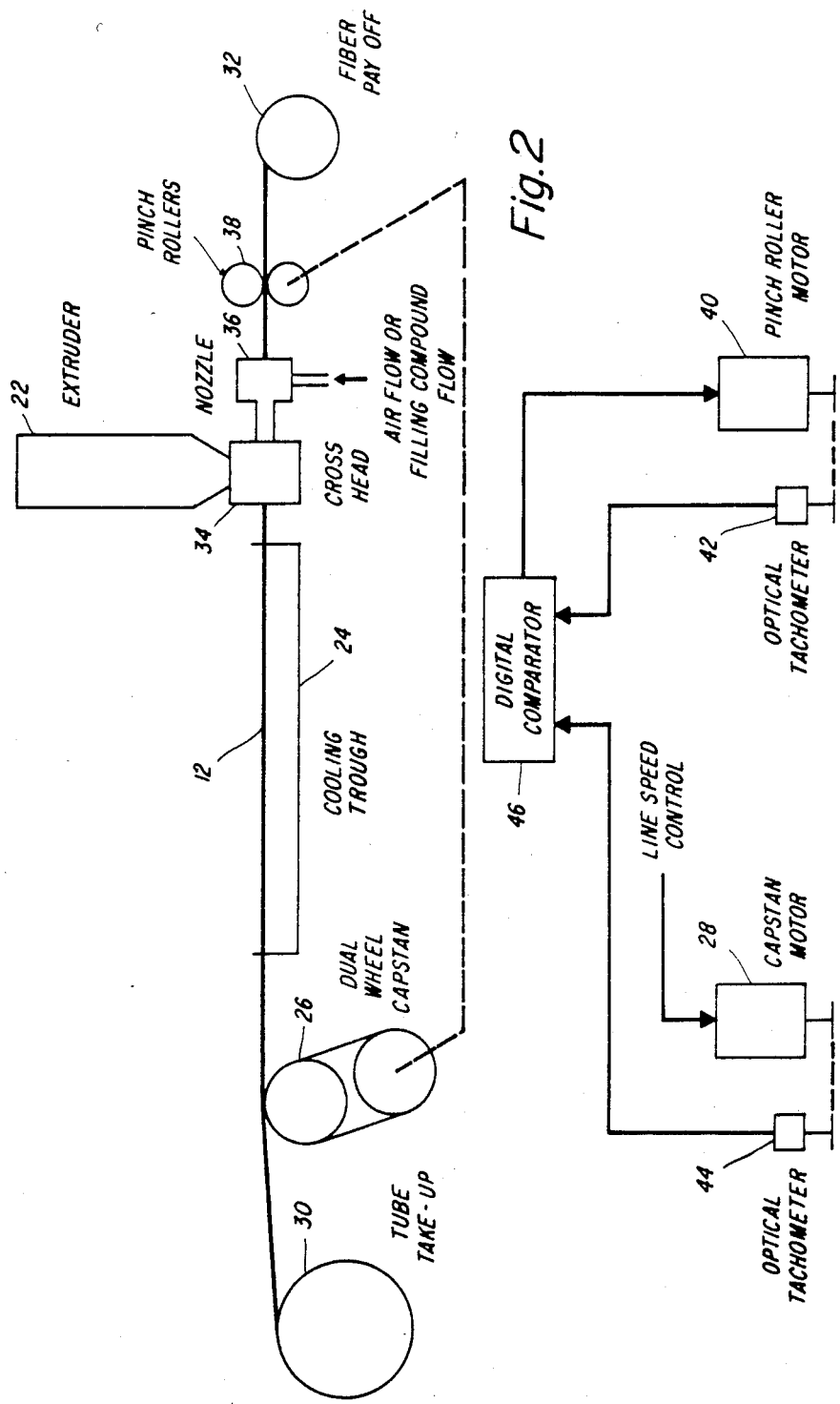
FIG. 2 is a block diagram of an embodiment of a system for controlling the feed of an optical fiber into a buffer tube.

In the schematic diagram shown in FIG. 1, an optical fiber 10 is fed into a tube 12 which is extruded through an extrusion die 14. The fiber is carried into the tube by a filling compound (not shown) which is fed through the center bore 16 of a core tip 18. The central bore 16 of core tip 18 has a diameter $d_1$ which is smaller than the inside diameter $d_2$ of the tube. In order to avoid possible deformation of the tube caused by turbulence of the flow of filling compound at the diameter discontinuity at the end of core tip 18, the end portion 20 of the bore of the core tip is preferably made of the same diameter as the inner diameter of the tube. When the fluid compound moves into the portion of the core tip of larger diameter or in the tube, it fills the larger volume and thus slows down to its final speed. The fiber on slowing down with the fluid accumulates slack which is depicted by the helical path of the fiber. Assuming that $V_1$ is the initial fiber speed, and $V_2$ is the speed of the tube being extruded through die 14 when for incompressible fluid compounds:

$$\frac{\pi}{4} d_1^2 V_1 = \frac{\pi}{4} d_2^2 V_2$$

and if the fiber moves at the same speed as the fluid then the excess fiber length is:

$$E = \frac{V_1 - V_2}{V_2} = \left[\frac{d_2}{d_1}\right]^2 - 1$$

The excess fiber length is therefore dependent on the ratio of buffer tube to core tip inside diameters and as such is dependent on process control for maintaining the inside diameter of the tube constant.

A preferred approach however is to establish the fluid flow sufficient for providing a higher excess fiber length than is actually required; the flow then maintains a continuous pull on the fiber. The actual rate of fiber advance is regulated by restraining the feed of fiber into the tube at a predetermined ratio with respect to the speed at which the tube is formed, thereby precisely controlling the excess fiber length level.

A suitable control system is shown in FIG. 2 of the drawings. There is shown a conventional extruder 22 adapted to form tube 12 which is pulled through a regular cooling trough 24 by a dual wheel capstan 26 driven by a motor 28 energized by a line speed control system. The tube is wound on a take up reel 30. An optical fiber 10 is payed-off from a reel 32 and fed into the cross-head 34 of the extruder through a nozzle assembly 36 including the above disclosed core tip 18. The fiber speed regulating system consists of two rubber rimmed pinch rollers 38, one of which is driven by a small stepping motor 40. These two rollers grip the fiber between them, pulling it off of the pay-off spool according to the velocity at the contact point. In order to avoid slippage, a caterpillar capstan may be used in place of pinch rollers.

The ratio of the fiber speed to the tube speed determines the excess fiber length. This quantity should be maintained within 0.03% of a set point which will usually be between −0.1% and +0.2% (depending on the performance requirements and the cable design) to obtain adequate optical fiber performance. A typical D.C. drive with tachometer control can provide 0.1% accuracy of spped at best. In order to provide adequate accuracy, an optical tachometer 42 with 1,000 counts per revolution is used to monitor the speed of the motor driving the pinch rollers. A similar tachometer 44 is used to monitor the speed of capstan motor 28. The signals from the tachometers 42 and 44 are fed to a digital comparator 46 which provides an output for regulating the speed of pinch roller motor 40. An accuracy of ±0.015% can be maintained with such a control system. Alternatively, the frequency of the output from tachometer 44 would be measured with a digital frequency meter. A micro-computer would then calculate the required pinch roller speed and control a programmable frequency synthesizer which would drive the pinch-roller stepping motor at the required speed. Another possible method uses variable frequency motors controlled by phase sensitive signal processing techniques.

Another method of regulating the excess fiber length follows a mechanical approach. The pinch rollers can be driven with an exceptionally high degree of accuracy by means of a direct mechanical linkage from the tube capstan as indicated by a dashed line in FIG. 2. As the tube capstan is normally driven with a powerful motor, it could be used to drive a flexible shaft which would in turn, through a gear box, drive the pinch rollers.

Figure 3:
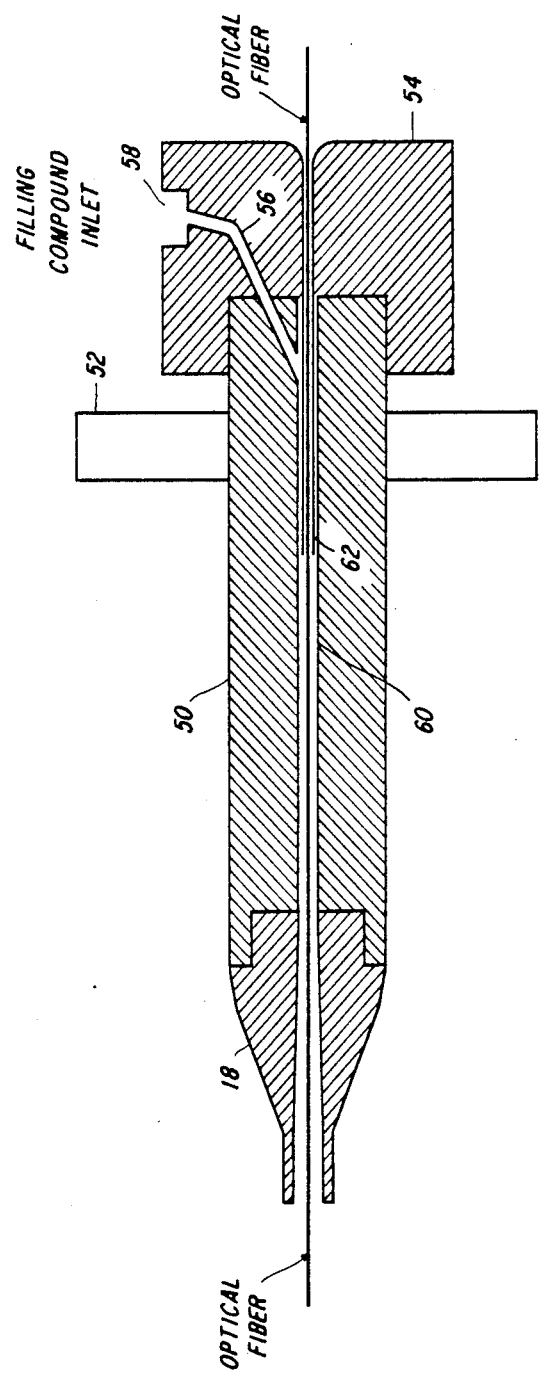
FIG. 3 illustrates an embodiment of a nozzle for feeding a fiber to a tube being formed by extrusion.

FIG. 3 of the drawings illustrates an embodiment of a suitable nozzle assembly for feeding the filling compound and the fiber to the crosshead of the extruder. The core tip 18 is mounted on the end of a holder 50 which is itself mounted to a flange 52. The filling compound is fed to the central bore of the core tip through an air nozzle block 54 located in the end of holder 50 and having a channel 56 running from a filling fixture 58 to a central bore 60 in the holder which is in line with the bore of the core tip. The fiber is isolated from the fluid by a guide tube 62 in the back end of the holder.

The guide tube extends past the point where the channel 56 meets the bore 60 of the holder. The guide tube is less than 1.0 mm in diameter with an inside diameter greater than 0.2 mm. The fiber is pulled forwards by the fluid compound as soon as the grip of the filling compound exceeds the friction of the guide tube.

FIG. 4 of the drawings is a schematic diagram of a system for achieving excess length using air instead of a filling compound to carry the fiber into the tube. The system is very similar to the one shown in FIG. 1 and corresponding elements have been identified by the same reference characters. Since air is compressible and has a much lower viscosity than the filling compound the mere change of diameter in the core tip is not sufficient to propel the fiber. To increase the force, the air is pumped through a guide tube 64, at a much faster rate $V_A$ than necessary to fill tube 12 and the excess air is vented off at 66 just before the back end of the core tip. In the guide tube 64, the air is travelling at several times the tube speed $V_2$. The excess air escapes from the head through air vent 66. Excess fiber length can be obtained up to the level where the force of the air on the fiber equals the resistance of the tube to accumulate fiber slack. Again the air jet tends to cause an excessive amount of excess fiber length which is held back by a regulating system as disclosed in FIG. 2.

Figure 5:
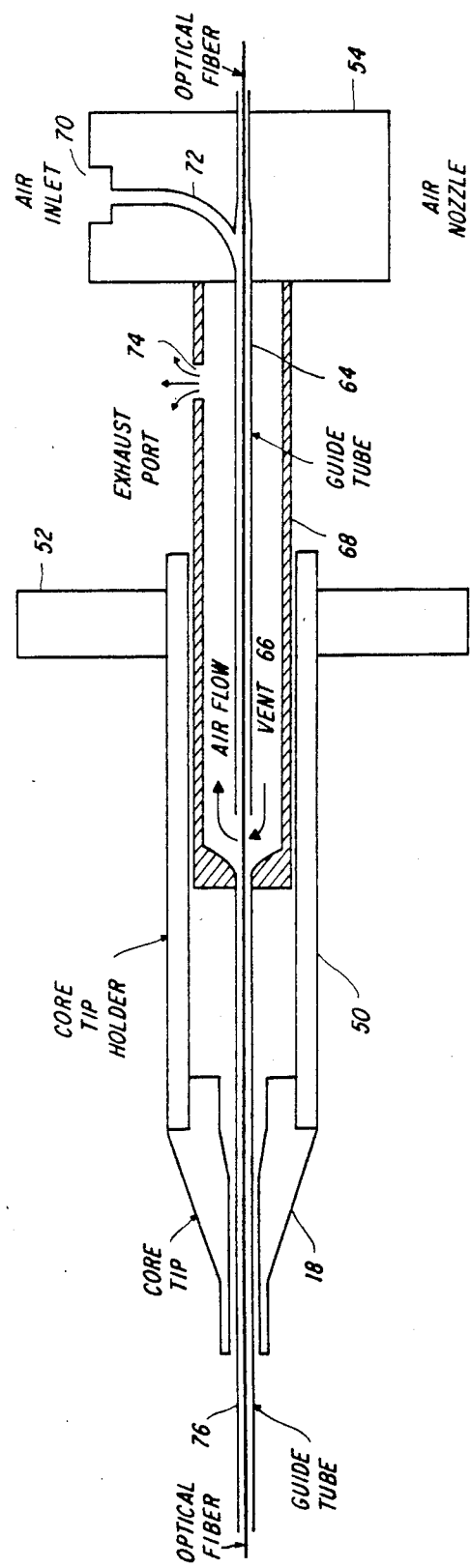
FIG. 5 illustrates an embodiment of a nozzle for feeding a fiber to a tube using air as the fiber carrier.

FIG. 5 of the drawings illustrates an embodiment of a suitable nozzle assembly for feeding air and a fiber to the crosshead of the extruder. The elements corresponding to those of FIG. 4 have been identified by the same reference characters. The core tip 18 is mounted on the end of a holder 50 which is secured to a flange 52. Air is fed to guide tube 64 through an air nozzle block 54 having an extension 68 secured to holder 50. Air enters block 54 from inlet 70 and flows through channel 72 into guide tube 64. Excess air escapes from the guide tube through vent 66 and flows out from extension 68 surrounding the guide tube 64 through exhaust port 74. The fiber is fed through the center bore of the nozzle and pulled forward through the guide tube 64 by the air flow into air inlet 70 as mentioned previously. In the embodiment shown in FIG. 5, guide tube 64 has an extension 76 which extends past the core tip for insertion into the extruded tube. This extension is preferably used to protect the fiber from sticking to the partially cooled extrudate. The essential difference in developing filled and unfilled buffer tubes is in the tooling requirements.

Using a fluid compound instead of air to feed the fiber into the tube fluid compound, provides the added benefit of preventing moisture from reaching the fiber. Since the presence of moisture rapidly reduces the strength properties (and hence the lifetime of the optical fiber) and since freezing water can break the bare fiber, the cable design must keep moisture away from the fiber. Although for many applications the cable sheath adequately prevents the ingress of moisture, the best protection is a fully filled cable.

The desirable properties of the filling compound used are:
(1) Water blocking, water repellent, non-hygroscopic.
(2) Must be compatible with buffer tube and resistant to migration through tube walls. Must also be compatible with fiber coating.
(3) Must pass environmental requirements and safety standards.
(4) Maintain viscosity of $-50°$ C. to $+70°$ C. range.
(5) Should have the minimum viscosity that will pass seepage specifications to minimize dynamic forces on the fiber.
(6) Soluble in a common solvent.
(7) Must not break down or separate under high pumping shear stress.
(8) Must not burn or generate gas at processing temperatures.

The chief material used thus far has been silicone oil thickened with fumed silica, although other materials including dual component compounds (which react in the buffer tube to form a gel) could also be used. It is to be understood that the intent of this patent application is to cover the process of controlling the fiber slack by the flow of fluid and that the compound's composition is outside the scope of the present invention.

Although the invention has been disclosed with reference to a preferred embodiment, it is to be understood that it is not limited to such embodiment but by the scope of the claims only.

We claim:

1. A process for controlling the feed of at least one optical fiber into a tube while the tube is being formed, said process comprising:
    (a) driving a tube being formed at a predetermined speed;
    (b) propelling at least one fiber into said tube with a sufficient force to move the fiber faster than the speed at which the tube is formed;
    (c) restraining the feed of fiber into the tube; and
    (d) regulating the excess length of fiber by controlling the degree of restraint imparted to said fiber based upon the speed at which the tube is driven so that the feed of fiber into the tube is faster than the speed at which the tube is being formed by a predetermined controlled amount.

2. A process as defined in claim 1, wherein the fiber is propelled into the tube by flowing a fluid into the tube through an orifice smaller than the diameter of the tube.

3. A system for controlling the feed of at least one optical fiber into a tube while the tube is being formed, said system comprising:
    (a) means for propelling at least one fiber into a tube with sufficient force to move the fiber faster than the speed at which the tube is being formed;

(b) means for restraining the feed of fiber into the tube;

(c) means for driving the tube being formed at a predetermined speed; and (d) means for regulating the excess length of the fiber by controlling the degree of restraint imparted to said fiber by said restraining means based upon the driven speed of the tube by the means driving the tube so that the feed of fiber into the tube is faster than the speed at which the tube is being formed by a predetermined controlled amount.

4. A system as defined in claim 3, wherein said means for propelling the fiber into the tube comprises a nozzle with a core tip having an orifice smaller than the inside diameter of the tube and means for flowing a fluid through said orifice to entrain the fiber by friction into the tube.

5. A system as defined in claim 4, wherein the fiber is carried out by a fluid filling compound and further comprising a guide tube for feeding the fiber into the nozzle and for isolating said fiber from direct contact with the filling compound at the first stage of introduction of the filling compound into the nozzle.

6. A system is defined in claim 4, wherein the fiber is carried by air and further comprising a guide tube for feeding the fiber into the nozzle and having means for venting the excessive air pressure before the core tip.

7. A system as defined in claim 6, wherein the guide tube extends into the formed tube to isolate the fiber from the extrudate in the region where the fiber may adhere.

8. A system as defined in claim 3, wherein said means for regulating the excess length of fiber comprises a first motor driving said restraining means, a second motor for driving said means for driving the tube, and means for precisely controlling the relative speeds of said first and second motors.

9. A system as defined in claim 8, wherein said means for precisely controlling the relative speeds of the first and second motors is a first optical tachometer coupled to the restraining means, a second optical tachometer coupled to the means for driving the tube, and a digital comparator having means for comparing the outputs of said first and second tachometers and for providing an output to said first motor to control the speed thereof.

10. A system as defined in claim 3, wherein said means for regulating the excess length of fiber comprises means for mechanically driving said restraining means based upon the driven speed of the tube by said means for driving the tube.

* * * * *